Patented Jan. 11, 1927.

1,614,315

UNITED STATES PATENT OFFICE.

CHESTER H. PAPÉ, OF PORTLAND, OREGON.

COMPOSITION FOR MAKING CASTING PATTERNS, PATTERN MOUNTS, AND THE LIKE.

No Drawing.   Application filed September 26, 1923.   Serial No. 665,014.

My invention relates to the making, from plastic compounds, of casting-patterns and pattern mounts or follow boards, such as used in foundries.

One of the difficulties generally experienced in making casting patterns of plastic composition is, the composition sets too rapidly for following closely the reliefs and depressions of the design which the pattern represents, and thus the pattern lacks the desired delicacy in detail.

Other faults common in the making of patterns from plastic composition are: the pattern lacks durability and has a rough exterior, which also interferes with the bringing out of the delicacy in detail.

The object of my invention is to provide a composition which will set sufficiently slowly to take on the details of the design; and furthermore a composition which besides will set hard, and may be given a smooth exterior finish and is tough so that it will not readily break or chip and will not be affected by moisture.

I attain my object by a composition consisting of magnesium oxid, or burnt magnesite, powdered silica, fibrous binder—preferably consisting of saw-dust flour and powdered asbestos impregnated with a solution of chloride of magnesium, and thoroughly intermixed in the proportions and in the following manner, viz:

One part of my composition consists of:

| | Parts. |
|---|---|
| Magnesium oxide or burnt magnesite | 7 |
| Powdered silica | 6 |
| Sawdust flour | ½ |
| Powdered asbestos | 1 | all parts being given by weight in avoirdupois measure. For the sawdust flour and powdered asbestos, or for the latter alone, may be substituted a material like the hemp-fiber, since the sawdust flour and powdered asbestos function as a binder.

The second part of the mixture of my composition consists of chloride of magnesium 5 parts, dissolved in a quantity of water. Water is then added until the solution has a specific gravity of 1.2 or has a reading on the Baumé scale of 24.

For casting patterns the mixture or solution No. 2 is thoroughly intermixed with mixture No. 1, so as to produce a mixture having the consistency of cream. The resulting composition may be conveniently poured into a mold by the use of a tube which extends a slight distance above the mold. Thus the material in the mold is subjected to a slight pressure due to the static head in this tube and thus tends to force my composition into every portion of the recesses in the mold. Thus the cast pattern takes on all of the details in the mold very accurately.

This composition takes approximately 8 hours to set sufficiently to permit its removal from the mold. When set it is dipped in water so as to remove any surplus materials and is polished with sand paper or similar abrasive to remove any particles which adhere to the pattern. The pattern is then allowed to become thoroughly dry on the surface, after which it is shellacked so that the exterior surface will be glossy and thus tend to prevent any mold sand from adhering thereto.

When my composition is used for making pattern mounts or follow boards I use the composition in a form which has a consistency of soft putty and so that it can be formed with a trowel. I obtain this consistency by mixing a sufficient amount of the solution No. 2 with the mixture No. 1 until the intermixture is of this consistency. This composition will set within 4 or 5 hours and at that time it is treated similarly as the composition previously described.

Besides the use above specified my composition may also be used for making tiles, plates and other ornamental articles which are made at present from plastic material which sets when dry.

I claim:—

1. A slow setting cementitious composition for making casting patterns and other articles comprising a mixture of comminuted magnesium chloride and fibrous material, approximately of the amounts specified, and a weak solution of chloride of magnesium, the ingredients being intermixed substantially as described.

2. A slow setting cementitious composition for making casting patterns and other articles comprising a mixture of comminuted magnesium chloride and fibrous material approximately of the amounts specified, and a solution of chloride of magnesium having a specific gravity of 1.2, approximately, the ingredients being intermixed substantially as described.

CHESTER H. PAPÉ.